Figure 12:
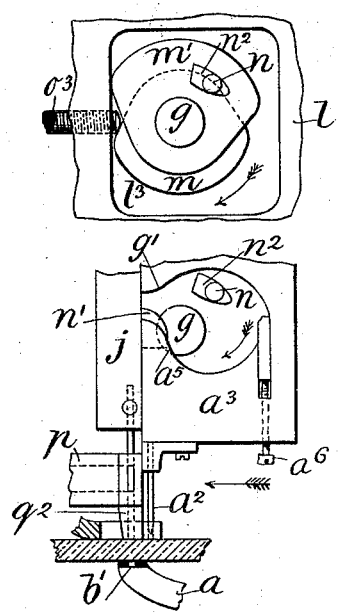

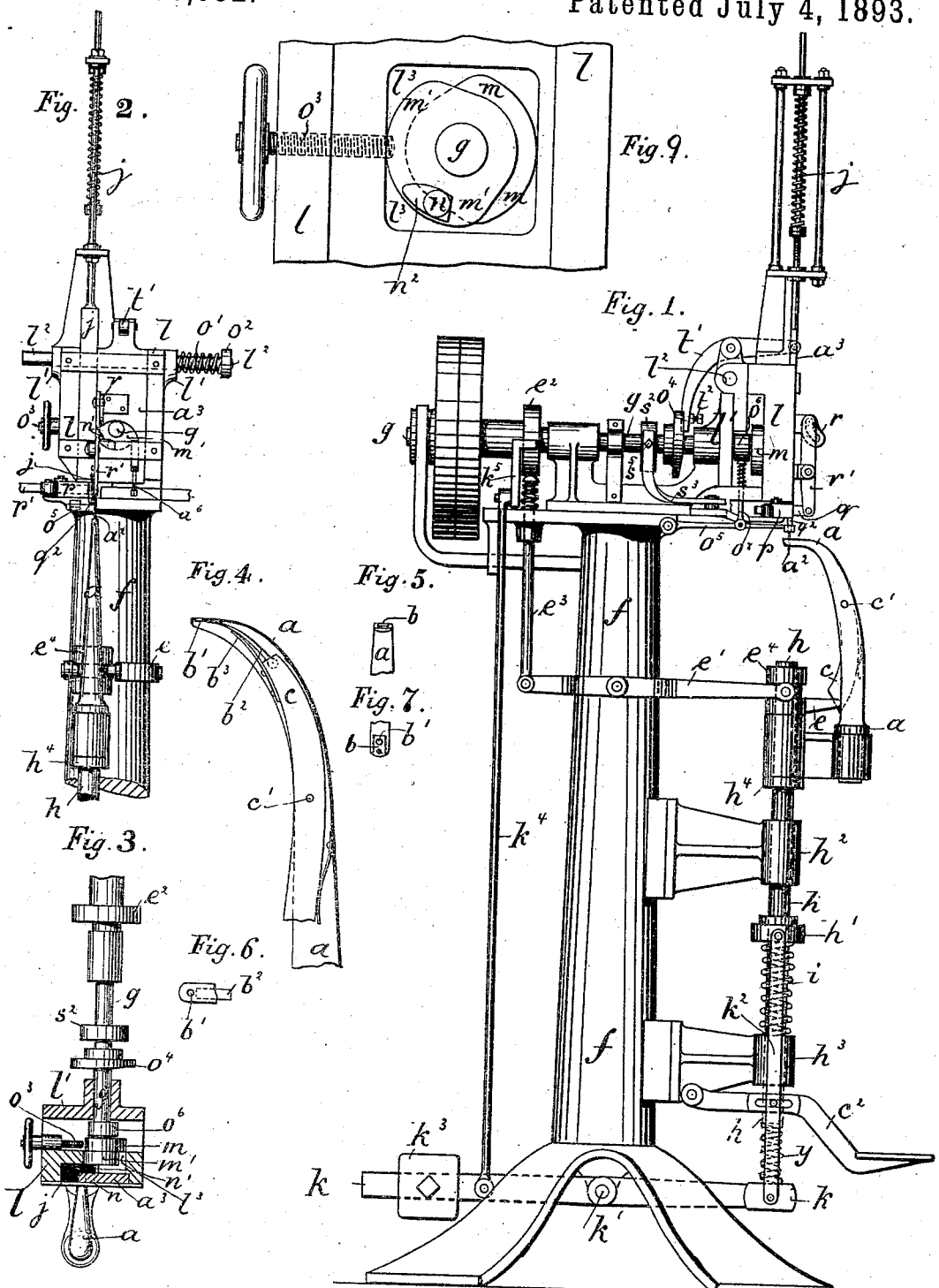

(No Model.) 3 Sheets—Sheet 2.
T. GARE.
PEGGING MACHINE.
No. 500,652. Patented July 4, 1893.
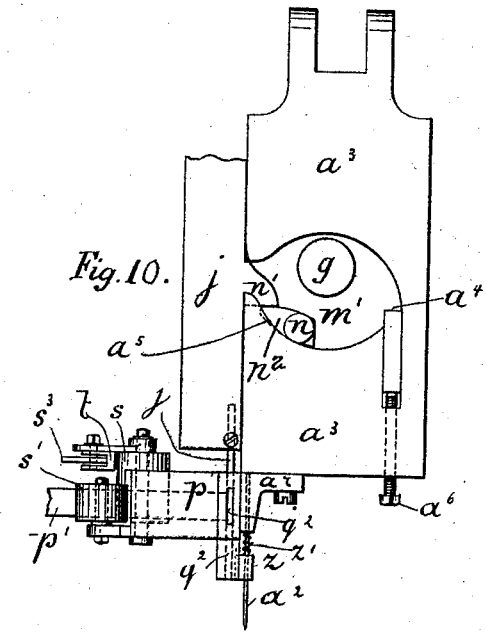
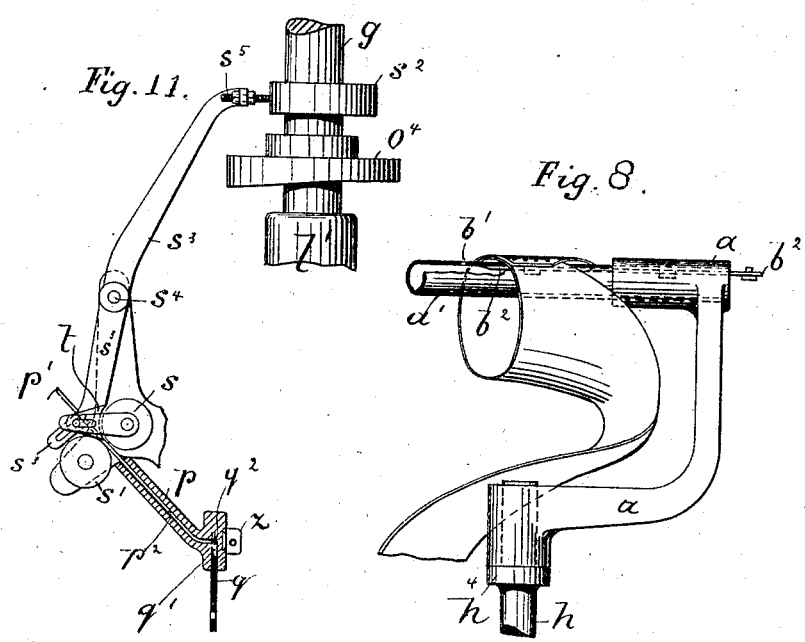
Witnesses.
Alfred Bosshardt.
Stanley Egerton Bramall.
Inventor.
Thomas Gare
per Ferdinand Bosshardt
Attorney.

(No Model.) 3 Sheets—Sheet 3.

T. GARE.
PEGGING MACHINE.

No. 500,652. Patented July 4, 1893.

Attest
Milton Mallon
J. M. Spear

Inventor
Thomas Gare
by Richards & Co.
Attys.

UNITED STATES PATENT OFFICE.

THOMAS GARE, OF STOCKPORT, ENGLAND.

PEGGING-MACHINE.

SPECIFICATION forming part of Letters Patent No. 500,652, dated July 4, 1893.

Application filed July 29, 1889. Serial No. 319,062. (No model.) Patented in England September 24, 1888, No. 13,751; in Belgium April 1, 1889, No. 85,625; in France April 4, 1889, No. 197,211; in Italy April 13, 1889, XLIX, 294; in Germany April 18, 1889, No. 52,286; in Switzerland May 21, 1889, No. 923; in Austria-Hungary September 7, 1889, No. 17,217 and No. 31,117, and in Canada September 9, 1889, No. 32,396.

*To all whom it may concern:*

Be it known that I, THOMAS GARE, a subject of the Queen of Great Britain, residing at Stockport, in the county of Chester, England, have invented certain new and useful Improvements in Pegging-Machines, of which the following is a specification.

The invention has been patented in Great Britain, No. 13,751, dated September 24, 1888; in Canada, No. 32,396, dated September 9, 1889; in France, No. 197,211, dated April 4, 1889; in Belgium, No. 85,625, dated April 1, 1889; in Germany, No. 52,286, dated April 18, 1889; in Austria-Hungary, No. 17,217 and No. 31,117, dated September 7, 1889; in Italy, XLIX, 294, dated April 13, 1889, and in Switzerland, No. 923, dated May 21, 1889.

My invention includes the special features hereinafter pointed out.

Figure 1, Sheet I, is a side view of a complete machine; Fig. 2. a front view of the upper portion and Fig. 3. a sectional plan thereof. Fig. 4 is a vertical section; Fig. 5. an end view; Figs. 6. and 7. plans of the upper part of the horn or support. Fig. 8 is a modification of the horn combined with the movable knife. Fig. 9 is an enlarged front view of the head motion, and Fig. 10 of the plunger, awl, and feeding motions, and Fig. 11 is a plan of the latter. Figs. 12 to 15 are views of different positions of the awl carrier and the mechanism directly connected therewith.

Similar letters refer to similar parts throughout the several views.

The column $f$ and brackets $h^2$, $h^3$, and $l'$ secured thereto constitute the frame work of the machine. The free end of the horn or support $a$, on which the parts to be united are placed, I form with an awl hole $b'$, see Figs. 4, 6 and 7, which permits the awl of forming a clear hole through the said parts and the front end of the peg of being driven through, so as to be cut level or nearly level therewith. For this purpose and the use of pegs of comparatively soft nature I employ the awl hole $b'$ to act as a stationary knife, by forming it with a knife edge, in a readily removable plate $b$, suitably fitted into the top of the horn or support $a$, see Figs. 5. and 7.

For the use of pegs of a comparatively hard nature, I employ in conjunction with the awl hole $b'$, a mechanically actuated knife $b^2$, see Figs. 4 and 6, preferably hinge like attached to a lever $c$, arranged to oscillate on a pivot $c'$, inside the horn or support $a$; which knife $b^2$, by means of a spring $b^3$ is kept in contact with the inside of the top of the horn or support $a$, so as to act against the peg to be cut off, which depends from the parts to be united into or through the awl hole $b'$. The lower end of the said lever $c$, see Fig. 1, is acted upon by a finger $e$, which is raised by means of a lever $e'$, pivoted to the column $f$ and by a cam $e^2$ fixed on the driving shaft $g$, acting upon a rod $e^3$ under the influence of a spring and connected to the back end of the said lever $e'$, the front end of which is caused to engage the bush $e^4$ on which is formed the finger $e$. The free end of the finger $e$ and the lower end of the lever $c$ are so arranged as always to remain in contact with each other, whatever the position of the horn or support $a$ may be, and when operated to cause the knife $b^2$ to be moved against the peg to be cut. The edge of the awl hole $b'$, may either be blunt or also form a cutting edge.

To unite parts of leather or other material to form circular or endless objects, such as belting, hose piping, &c., by means of leather or wood pegs, the top of the horn or support $a$ is furnished with a hollow arm $a'$, preferably of round section, see Fig. 11. In the top of this arm an awl hole $b'$ is formed, which may be formed as hereinbefore described to act itself, as a knife, or it may be used in conjunction with a partially rotating or sliding knife $b^2$, employed inside the arm $a'$. and actuated mechanically from any moving part of the machine. In each case the horn or support $a$ is mounted and permitted to swivel on a collar $h^4$, on the top of the vertical shank $h$.

The horn or support $a$ is controlled in its operation as to pressure and position by means of a lever K pivoted at $k'$ and connected to the loose collar $h'$ on the shank $h$ by the links $k^2$ a spring $i$ being interposed between the collar and the bearing $h^3$ on the column. A lighter spring $y$ is interposed between the shank and the lever. The lever is weighted as shown at $k^3$ and is operated through a rod $k^5$ and a lever $k^5$ from a cam $e^2$ on the driving shaft $g$. By means of these devices the horn is kept up under strong resistance during the action of the awl and driver, the strong spring $i$ and the weight then being in action. During the subsequent feeding action the cam $e^2$ and lever operate to take off the strong pressure of the spring $i$ the weaker spring then affording the necessary support and giving an easy feeding action. The horn may be depressed by a foot lever $c^2$ hinged to the bracket $h^3$ and connected to the link $k^2$.

For the purpose of obtaining and imparting to the movable part $l$ of the head $l$, $l'$, of the machine (carrying the awl $a^2$ and plunger $j$ and sliding on the stud $l^2$, in the stationary part $l'$,) an intermittent and variable feed motion capable of adjustment for various peg distances, a double cam $m$, $m'$, see Fig. 9, is employed on driving shaft $g$, in such a manner, that the throw of one cam part $m$ can be varied and it commences to impart motion to the movable head part $l$ or feed before the awl $a^2$ enters, while the other cam part $m'$ completes the feed, after the awl $a^2$ has entered the parts to be united, and completes its stroke when over the awl hole $b'$, the travel of the awl $a^2$ and plunger $j$ relative to the horn or support $a$, remaining always the same, while the movement of the head part $l$ may be varied to suit various peg distances and the awl hole $b'$ permits of the awl $a^2$ passing into or through the top of the horn or support $a$, thus forming a clear hole through the parts to be united. The working surfaces of the aforesaid double cam $m$ $m'$ are formed opposite to each other and struck from one center, the working surface of the back part $m$ (by means of the spring $o'$ placed on the stud $l^2$, between a collar $o^2$ fixed thereon, and the stationary part head $l'$) being always kept in contact with a screw spindle $o^3$, carried by and made adjustable on the movable head part $l$ of the machine, and the front part $m'$ acting inside the cavity $l^3$ thereof. The face of the front part $m'$ of the double cam $m$, $m'$, see Fig. 10, is furnished with an eccentric projection $n^2$, which at certain times comes into contact with and acts upon a projection $n'$ formed on the plunger $j$, which is under the influence of a strong spring $j'$, see also Figs. 1. and 2. (or weight, or combination of both spring and weight,) for the purpose of lifting the plunger $j$ and driving the peg into the parts to be united. In order to facilitate the feeding and forming of a clear hole through the latter, I cause the awl $a^2$ to descend intermittently by forming the cam slide $a^3$ to which is attached the awl $a^2$, see Fig. 10, and which is fitted into the face of the movable head part $l$ and acted upon by a stud $n$ formed upon the aforesaid eccentric projection $n^2$, with two throws or cam surfaces $a^4$ and $a^5$, which causes the awl $a^2$ to descend, at first only a short distance into the parts to be united and then being fed or brought over the knife or awl hole $b'$, of the horn or support $a$, it completes its descent and passes entirely through it and into or through the knife or awl hole $b'$ of the horn or support $a$, during which time the material to be united is held firmly and securely together by the action of the aforesaid spiral spring and weights $i$ and $k^3$.

Figure 13:
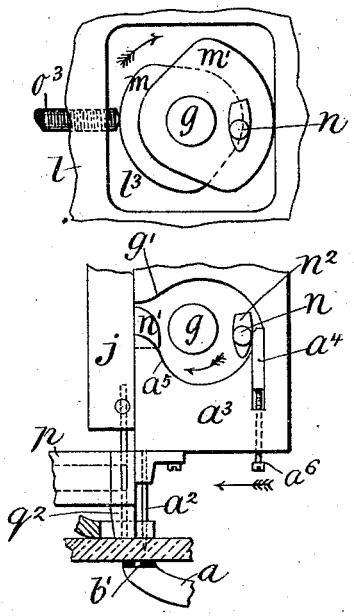
Figure 14:
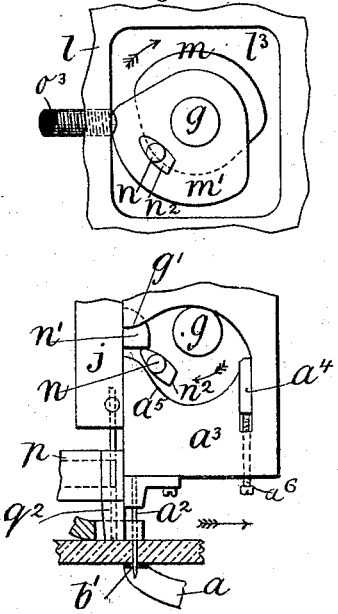
Figure 15:
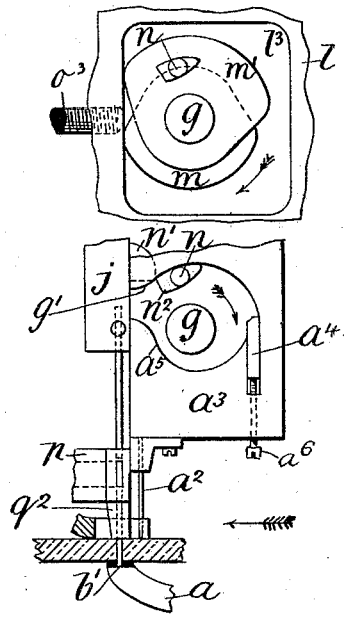

Referring to Fig. 12—the upper part of which shows the opening in the movable head $l$ and the cams in said opening and the lower part of said figure, the opening in the awl carrier with the cam surfaces it will be seen that the awl is in normal position or at the extreme right hand limit of its stroke, the awl being out of action and above the work. The position of the cam device $m$ $m'$ at this time is shown on the upper part of the figure. The revolution of the cam device in the direction of the arrow will bring the cam surface $m$ into contact with the screw $o^3$ and the head $l$ with the carrier will be moved laterally one step as shown in Fig. 13. The adjustment of the screw $o^3$ determines the amount of the initial step and it can be made more or less as desired. At the completion of this step there is a dwell as the concentric part of the cam is now in action and it is during this dwell that the projection $n$ contacts with the cam surface or throw $a^4$ and moves the carrier one step downward, as shown in Fig. 13—which represents the completion of the first step laterally and vertically the awl passing only partly through the material. The continued revolution of the cam device now brings the surface $m'$ into action against the wall of the opening $l^3$ of the head $l$ as shown in Fig. 14— and the final lateral step is completed this step determining the amount of feed and bring the awl over the awl hole. As the left hand limits of the stroke remain constant, it will be clear that by varying the point at which the awl first enters the material the length of the second step varies accordingly and thus the feed may be regulated. When the concentric part of the second cam surface is active and the second lateral step has been completed the projection $n$ comes in contact with the second cam surface $a^5$ and the second vertical step is thereby completed as shown in Fig. 14—after which the continued revolution of the cam and the action of the spring $o'$ causes the parts to move to the limit of their right hand movement, as shown in Figs. 15 and 12.

It will be understood that I do not wish to limit myself to the precise form of means for operating the awl carrier step by step in either direction.

For the purpose of timing the first drop of the awl $a^2$, as may be required, the cam part $a^4$ which effects the same, is made adjustable in the slide $a^3$, by means of a screw $a^6$.

Below the plunger $j$, is secured underneath the moving head part $l$, a bracket $p$, see Figs. 10 and 11 into which is fed automatically the peg strip, from which the pegs are cut successively by means of a knife $q$ sliding therein. The slot $p^2$ formed in the bracket $p$, through which the peg strip $p'$ passes, is in connection with the cavity $q'$ in which the knife $q$ slides. The said cavity $q'$ communicates at its end with the slot $p^2$ and the plunger throat or hole $q^2$ formed concentric with the plunger $j$. The knife $q$ is actuated in its cavity $q'$ by means of a cam $r$ fixed to the face of the cam slide $a^3$, and a lever $r'$ arranged to rock on the face of the movable head part $l$, and one end of which is attached to the knife $q$ and the other end being acted upon by the said cam $r$. On the peg strip $p'$ having been projected into the cavity $q'$, the knife $q$, by the said cam $r$ and lever $r'$, is caused to move toward and cut off the projecting part of the same, which then forms the peg and is held over the plunger throat $q^2$, by the knife $q$, for the plunger $j$ to drive it through the same into the hole previously formed by the awl $a^2$ in the parts to be united. The peg strip $p'$ is automatically and intermittently fed through the slot $p^2$ into the knife cavity $q'$ in the bracket $p$, by means of a variable feed motion, consisting of a pair of rollers $s$ and $s'$ fixed in front of the slot $p^2$, one of which is intermittently rotated by means of a cam $s^2$ fixed onto the driving main shaft $g$, of the machine, acting upon a lever $s^3$ arranged to rock on a stud $s^4$. The front end of the lever $s^3$ is furnished with a friction pawl $t$, which is caused to grip the top part of the roller $s$, when the cam $s^2$ actuates the lever $s^3$, the respective end being furnished with an adjustable screw $s^5$, on which the cam $s^2$ acts, by means of which the amount of feed can readily be regulated as desired, see Figs. 10 and 11. When the top of the peg is not driven quite level with the parts to be united and in order that the portion left in the plunger throat or hole $q^2$, see Figs. 1, 13. and 14, will not be broken off by the latter on feeding, I connect the pressure foot $o^5$, see Fig. 1. above the horn or support $a$, hinge like to the framework $f$ of the machine. This foot $o^5$ is caused to depress the parts to be united, and thereby draw the top of the peg out of the plunger throat or hole $q^2$, before the next feeding operation commences, by means of a cam $o^6$ fixed on the driving shaft $g$, actuating a rod $o^7$ attached to the pressure foot $o^5$.

In order to prevent the awl $a^2$ from bending when entering the material under operation a support or guide $z$ is arranged in combination therewith, through which the awl $a^2$ passes and which may either be attached to the moving head part $l$ rigidly, for instance to the throat $q^2$, as shown, or it may be brought under the influence of a spring $z'$, interposed between the awl bracket $a^7$ and the guide or support $z$, see Fig. 10.

What I do claim as my invention, and desire to secure by Letters Patent, is—

1. In a pegging machine, the combination of the awl slide $a^3$ and awl, the peg driver, the means for operating the said parts, the means for cutting the peg consisting of a movable knife $b^2$ and means for inclosing the said knife consisting of the horn or support having the perforation $b'$ the said knife being arranged entirely below the bearing surface of the horn and shielded thereby from contact with the material being operated on, and means for sliding the knife and holding the same against the inner side of the upper wall of the horn, consisting of the oscillating lever $c$ pivotally connected to the said knife at its upper end and the spring $b^3$ for pressing the knife against the horn, substantially as described.

2. In combination, the awl, the movable head $l$, the carrier $a^3$, the means for moving the said head and carrier step by step laterally consisting of the cam $m$ for giving the initial movement and the second cam $m'$ for completing said movement, and the means for moving the carrier step by step vertically, substantially as described.

3. In combination, the awl, the movable head $l$ the awl carrier, the means for moving the head and carrier step by step laterally, and the means for moving the carrier step by step vertically including the cam surfaces $a^4$ and $a^5$ one located in rear of the other whereby they are acted upon in succession, substantially as described.

4. In combination, the awl, the movable head $l$, the awl carrier, the means for moving the said carrier step by step laterally, consisting of the cam $m$ for giving the initial movement and the second cam $m'$ for completing the said movement, the means for operating the carrier one step downward at the completion of the initial lateral movement and the means for determining and adjusting the length of the initial movement consisting of the screw $o^3$ bearing on the cam $m$ which gives the initial movement, substantially as described.

5. In combination the awl the head $l$ having the opening $l^3$ and the carrier having the cam bearing surfaces $a^4$ and $a^5$ the cam $m$ for giving the initial lateral step, the screw $o^3$ on the head for engaging the said cam to determine and adjust the said movement, the cam $m'$ for engaging the wall of the opening $l^3$ for completing the said movement and the projection $n$ on the cam $m'$ for engaging the cam surfaces $a^4$ $a^5$ to move the carrier step by step vertically, substantially as described.

6. In a pegging machine, the combination of the awl and operating mechanism therefor, the feeding mechanism the horn and its shank $h$, and the means for operating the same consisting of the lever $k$ the strong spring $i$, the loose collar $h'$ on the shank and above the spring the connection from the lever to the loose collar, the means for operating the lever $k$ and the light spring $y$, substantially as described.

THOMAS GARE.

Witnesses:
FERDINAND BOSSHARDT,
STANLEY EGERTON BRAMALL.